UNITED STATES PATENT OFFICE.

JOSEPH ALBERT, OF MUNICH, BAVARIA.

IMPROVEMENT IN PHOTO-MECHANICAL PRINTING.

Specification forming part of Letters Patent No. 97,336, dated November 30, 1869; reissue No. 4,328, dated April 11, 1871; reissue No. 6,188, dated December 22, 1874; application filed August 15, 1873.

*To all whom it may concern:*

Be it known that I, JOSEPH ALBERT, of Munich, in the Kingdom of Bavaria, photographer, have invented Improvements in Printing Photographs with Fatty Inks, of which the following is a specification:

It has been for some time known that chrome-gelatine is sensitive to light, and that the parts on which light has acted become insoluble, and will receive fatty ink, while the parts not so acted upon, after being moistened, reject the ink.

Various processes have been tried, with more or less success, in which this property of chrome-gelatine is made available by means of light transmitted through a negative, and acting on a film of said material, which is washed, inked, and transferred to stone, copper, or other suitable material, or prepared directly on the surface thereof, and inked and printed from by means of a press.

These processes have been attended with difficulties, among the most serious of which are want of durability of the film when printed from, and of permanency in its attachment to the surface to which it is affixed for printing, and, also, in not enabling the operator to watch the progress of the action upon the gelatine film of the light transmitted through the negative, and arrest the development of the image at the proper period of its formation.

It is the object of my invention to obviate these difficulties; and it consists in the mode of preparation and treatment of a film of gelatinous, albuminous, or other equivalent substance, rendered sensitive to light, whereby it is made capable of receiving the photographic image under the negative in a transparent or sufficiently translucent condition to admit of the process being observed through said film, and the transparent or partially-transparent tablet on which it is mounted for convenient handling and for printing, and whereby a greater degree of durability is obtained.

The film may be of any suitable or desirable thickness for the purpose, and it is apparent to those skilled in the art, and to those having a knowledge of the properties of chrome-gelatine, that it may be composed entirely of that material, or its equivalent; but my preferred method of forming the film is to employ a different quality of gelatine for that surface which is to receive the image. In order to accomplish this, my preferred method is to prepare a thinner film than I propose to use, and harden it by exposure to the light on one surface, protecting the other so that it will remain in an unchanged condition, and capable of uniting with a subsequent coat, the latter being composed of a different quality of gelatine; and to this end I prefer to perform my process in two successive stages, which consist substantially as follows:

As no material equals glass for the certainty and beauty of the results obtained from it, I take as the base or tablet on which to prepare the film a piece of plate-glass, which is cleaned with alcohol, and, by preference, flowed with a mixture of albumen and gelatine, or either separately, and bichromate of ammonia, and left horizontal to dry. When dry it is laid with its coated side on a dark surface, and exposed for a short time to light transmitted through the glass, until the surface in contact therewith has become insoluble through the agency of the light, so as to prevent the moisture, to which the plate is afterward subjected, from penetrating to the glass. After this exposure the plate is laid for half an hour in water, and then set aside to dry. This part of the process can be performed months in advance of applying the sensitive surface if the film be kept from exposure to light. The process consists in covering the gelatinous coating thus prepared with the final sensitive coat, composed, preferably, of isinglass, one part, gelatine, two parts, or thereabout, and chromate or bichromate of ammonium, and drying it in the same manner as the first. When dry, the film is ready to receive the picture, and is placed in the pressure-frame on a negative, and exposed to the light in the same manner as is done with an albumen print, except that the action of the light is watched from the back, and the removal effected at the proper moment to render the image perfect. The film is then washed in water to remove all unchanged chromates, and may then be treated with chrome-alum, chlorine-water, or any other coagulating material, in order to render the coat more durable. When dry it is printed from in the usual lithographic manner upon a press adapted to that purpose.

The essential principle of my invention consists in hardening one surface of the film, so as to render it insoluble, while yet its other surface remains sensitive to the action of light, and capable of receiving the impression of the picture, or sufficiently adhesive to unite with another layer or film of sensitive material from which to print; and if these conditions be observed both the first and second layers will permit the use of other materials, such as glue, gum, dextrine, or almost any adhesive or gelatinous substance, as well as any of the salts of chromium, with more or less success.

It is apparent from the foregoing description that the ultimate purpose of my invention is to produce a film, or plate provided with a film, so sensitive on the one surface as to be capable of receiving the photographic image, and so hardened on the other as to be insoluble and durable, substantially as set forth.

It is obvious that while glass is the most ready and facile material for the formation of a film by my improved method, and possesses the greatest transparency, yet other materials which are imperfectly transparent or translucent will answer, the object being to retain the film during the process of printing and secure durability, and the consequent retention of the film to the surface or tablet to which it is affixed, it being evident that the insolubility imparted in the first stage of my process, by preventing moisture from penetrating through the film, will insure its permanent adhesion to the substance to which it is affixed.

Having thus described my invention, what I claim as new, and desire to secure by Letters Patent, is—

1. The described process of producing a chrome-gelatine film for printing from with fatty inks, having one surface superhardened by light and its other surface prepared by photographic agency, when sufficiently transparent or translucent to permit the action of light through a negative to be viewed and arrested at the proper time, substantially as set forth.

2. The described process of producing a chrome-gelatine film for printing from with fatty inks, one surface of which is hardened by the action of light, so as to be rendered insoluble and durable, while the other surface remains sensitive, for the purpose, when exposed to light transmitted through a negative, of receiving the picture, substantially in the manner and for the purpose set forth.

3. A chrome-gelatine film prepared with a surface produced in the manner described for printing from with fatty inks, and a superhardened under surface affixed, by the action of light, to a glass tablet or other transparent or translucent medium of sufficient strength to resist the process of printing, substantially as described.

4. A glass plate for the printing of photographic pictures when provided with a film having its under surface superhardened by light, substantially as and for the purpose set forth.

5. The described process of producing a chrome-gelatine film for printing from with fatty inks, superhardened by light, and prepared by photographic agency when treated with chrome-alum, chlorine-water, or other coagulating material for rendering its upper or printing surface more durable, substantially as set forth.

6. The described process of producing a film for printing from with fatty inks, one side of which is preserved sensitive or adhesive, as may be desired, by laying it upon a dark surface while the opposite surface is being subjected to the hardening process, substantially as set forth.

In witness whereof I have hereunto signed my name in the presence of two subscribing witnesses.

JOS. ALBERT.

Witnesses:

CARL BRITNOR,

ADOLPH LOCHLE.